(12) United States Patent
Robinson

(10) Patent No.: US 8,169,698 B1
(45) Date of Patent: *May 1, 2012

(54) DUAL MOVABLE PROJECTION SCREEN STRUCTURE

(75) Inventor: Mark K. Robinson, Redondo Beach, CA (US)

(73) Assignee: Stewart Filmscreen Corporation, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,168

(22) Filed: Aug. 8, 2011

(51) Int. Cl.
*G03B 21/56* (2006.01)

(52) U.S. Cl. .......................... 359/449; 359/450; 359/461

(58) Field of Classification Search .......... 359/449–450, 359/461, 443; 348/841–842; 160/239
See application file for complete search history.

(56) References Cited

U.S. PATENT DOCUMENTS

| | | |
|---|---|---|
| 1,908,989 A | 5/1933 | Lahey et al. |
| 2,528,311 A | 10/1950 | Hurley |
| 3,008,518 A | 11/1961 | Hayes |
| 3,101,644 A | 8/1963 | Lopez-Henriquez |
| 3,444,919 A | 5/1969 | Karoll |
| 3,882,921 A | 5/1975 | Sandall |
| 4,020,889 A | 5/1977 | Karoll |
| 4,089,361 A | 5/1978 | Zeppmeisel |
| 4,238,969 A | 12/1980 | Krause |
| 4,329,716 A | 5/1982 | Porco |
| 4,357,978 A | 11/1982 | Keller et al. |
| 4,365,660 A | 12/1982 | Henkenjohann |
| 4,369,829 A | 1/1983 | Casiday et al. |
| 4,705,355 A | 11/1987 | Espo |
| 5,140,461 A | 8/1992 | Blood et al. |
| 5,353,152 A * | 10/1994 | Realmuto ...................... 359/461 |
| 5,392,835 A | 2/1995 | Wildt |
| 5,467,266 A | 11/1995 | Jacobs et al. |
| 5,523,880 A * | 6/1996 | Pidgeon et al. ............... 359/450 |
| 5,566,736 A | 10/1996 | Crider et al. |
| 5,570,138 A | 10/1996 | Baron |
| 5,732,419 A | 3/1998 | Feist |
| 6,111,693 A | 8/2000 | Crews et al. |
| 6,189,592 B1 | 2/2001 | Domel |
| 6,296,040 B1 | 10/2001 | Schaap |
| 6,407,798 B2 | 6/2002 | Graves et al. |
| 6,595,262 B2 | 7/2003 | Chen |
| 6,614,594 B2 | 9/2003 | Murasugi et al. |
| 6,816,308 B1 | 11/2004 | Shopp |
| 6,901,987 B1 * | 6/2005 | Graham ...................... 160/121.1 |
| 7,042,640 B2 * | 5/2006 | Devos et al. .................. 359/443 |
| 7,165,688 B2 | 1/2007 | Cameron |

(Continued)

FOREIGN PATENT DOCUMENTS

WO  WO 2009/089597  7/2009

*Primary Examiner* — Christopher Mahoney

(74) *Attorney, Agent, or Firm* — Donald E. Hasse; Hasse & Nesbitt LLC

(57) ABSTRACT

An integral, dual projection screen structure for displaying an image from a projection source. The projection screen structure comprises a frame; first and second movable projection screens disposed within the frame, each movable screen having an operable roller for rolling and unrolling the screen and being mounted at the top portion of the frame; and a masking system having at least two movable masking panels disposed within the frame over at least two of the top portion, bottom portion and first and second side portions of the front side of the sheet in the second screen.

21 Claims, 8 Drawing Sheets

U.S. PATENT DOCUMENTS

| | | |
|---|---|---|
| 7,328,466 B1 | 2/2008 | Bowen |
| 7,397,603 B2 | 7/2008 | Peterson et al. |
| 7,466,483 B2 * | 12/2008 | Danthony ................... 359/450 |
| 7,489,443 B2 * | 2/2009 | Congard et al. ............. 359/461 |
| 7,602,549 B2 | 10/2009 | Yamauchi |
| 7,637,575 B2 | 12/2009 | Amari et al. |
| 7,706,066 B2 | 4/2010 | Adams et al. |
| 7,710,646 B2 | 5/2010 | Stewart et al. |
| 7,777,948 B2 * | 8/2010 | Chung et al. ................. 359/450 |
| 7,861,761 B2 | 1/2011 | Martineau et al. |
| 7,995,273 B1 * | 8/2011 | Robinson ..................... 359/449 |
| 2004/0057109 A1 | 3/2004 | Edney |
| 2005/0270644 A1 * | 12/2005 | Devos et al. ................. 359/461 |
| 2008/0174865 A1 | 7/2008 | Stewart |
| 2009/0185269 A1 * | 7/2009 | Chung et al. ................. 359/450 |
| 2009/0277593 A1 | 11/2009 | Stewart |
| 2009/0277594 A1 | 11/2009 | Stewart et al. |

\* cited by examiner

DUAL MOVABLE PROJECTION SCREEN STRUCTURE

FIELD OF INVENTION

The present invention relates generally to a projection screen for use in displaying imagery from a television, motion picture projector, video projector, computer generated image display, or the like. More particularly, the invention relates to an integral projection screen configured to include two movable projection screens and a masking system having movable masking panels in a single frame.

BACKGROUND OF INVENTION

Projection screens are used in a large variety of situations for slide or motion picture projection, television or computer generated image display, or other imagery projection. Screen systems are particularly useful in a home theater or conference room setting. The formatting of the various kinds of imagery projection results in the need for various styles of projection screens. The screens may comprise different materials and have varied textures and optical properties to facilitate viewing of an image projected thereon. These optical properties may include, for example, gain, contrast (e.g., ambient light rejection), resolution, uniformity, projection format, etc. Types of screens that have different optical properties include white matte, silver matte, and pearlescent screens. White matte screens work well in most situations where presentation material is being projected and ambient light is controllable. White screens have about the same brightness from all viewing angles and are widely used. Silver screens are designed with metallic pigments embedded in the material to provide a highly reflective surface. These screens are well suited for 3-D films because they do not de-polarize projected light, which has been polarized to isolate left and right eye content. Silver screens maintain the polarization of the images from the projection source, and provide a brighter image than possible on a white matte screen. In order to accommodate the different styles of projection screens, numerous screen systems are disclosed in the art.

In view of the above, it would be desirable to provide a projection screen structure for home theaters, post production and other viewing environments that integrates two movable screens having surfaces with different optical properties into a single structure. It would also be desirable to hang the movable screens such that when the second screen is unrolled in the projected position, it is located in nearly the same optical plane as the first screen. Each screen would thus hang in nearly the same plane, thereby eliminating the need to refocus the optical projection equipment used to project the image on the two screens.

SUMMARY OF INVENTION

The present invention relates to an integral projection screen structure for displaying an image from a projection source, comprising a frame having generally parallel top and bottom portions and generally parallel first and second opposing side portions, each side portion forming a channel, first and second movable projection screens having surfaces with different optical properties disposed within said frame, each movable projection screen comprising an operable roller for rolling and unrolling the screen and being mounted at the top portion of said frame, and a flexible sheet of material having a projection surface for displaying an image projected thereon, said sheet of material having a front side and a back side, a top portion connected to the roller and being movable between a rolled condition and an unrolled condition, a bottom portion opposite the top portion, and first and second opposing side portions for disposition within the channels formed by the side portions of the frame when the sheet is in the unrolled condition, the second screen being nearest the viewer in the unrolled condition, and a masking system having at least two movable masking panels disposed within said frame over at least two of the top portion, bottom portion and first and second side portions of the front side of the sheet in the second screen.

The invention also relates to an integral projection screen structure as described above in which each movable projection screen further comprises a motor operatively connected to the roller such that the roller rotates about its longitudinal axis in response to the operation of the motor, and the masking system has top, bottom, left and right movable masking panels disposed within said frame over the respective top portion, bottom portion and first and second side portions of the front side of the sheet in the second screen. In one embodiment, the top portion of the frame houses the rollers and the motors, and the bottom portion of the frame forms a channel for receiving the bottom portion of each screen when in an unrolled condition.

In another embodiment, the invention relates to an integral projection screen structure as described above in which the masking system has top, bottom, left and right independently movable masking panels disposed within said frame over the respective top portion, bottom portion and first and second side portions of the front side of the sheet in the second screen.

In yet another embodiment, the projection screen structure comprises electronically controllable motorized means operatively connected to each masking panel for selectively moving each masking panel.

DETAILED DESCRIPTION OF THE INVENTION

Figure 1:
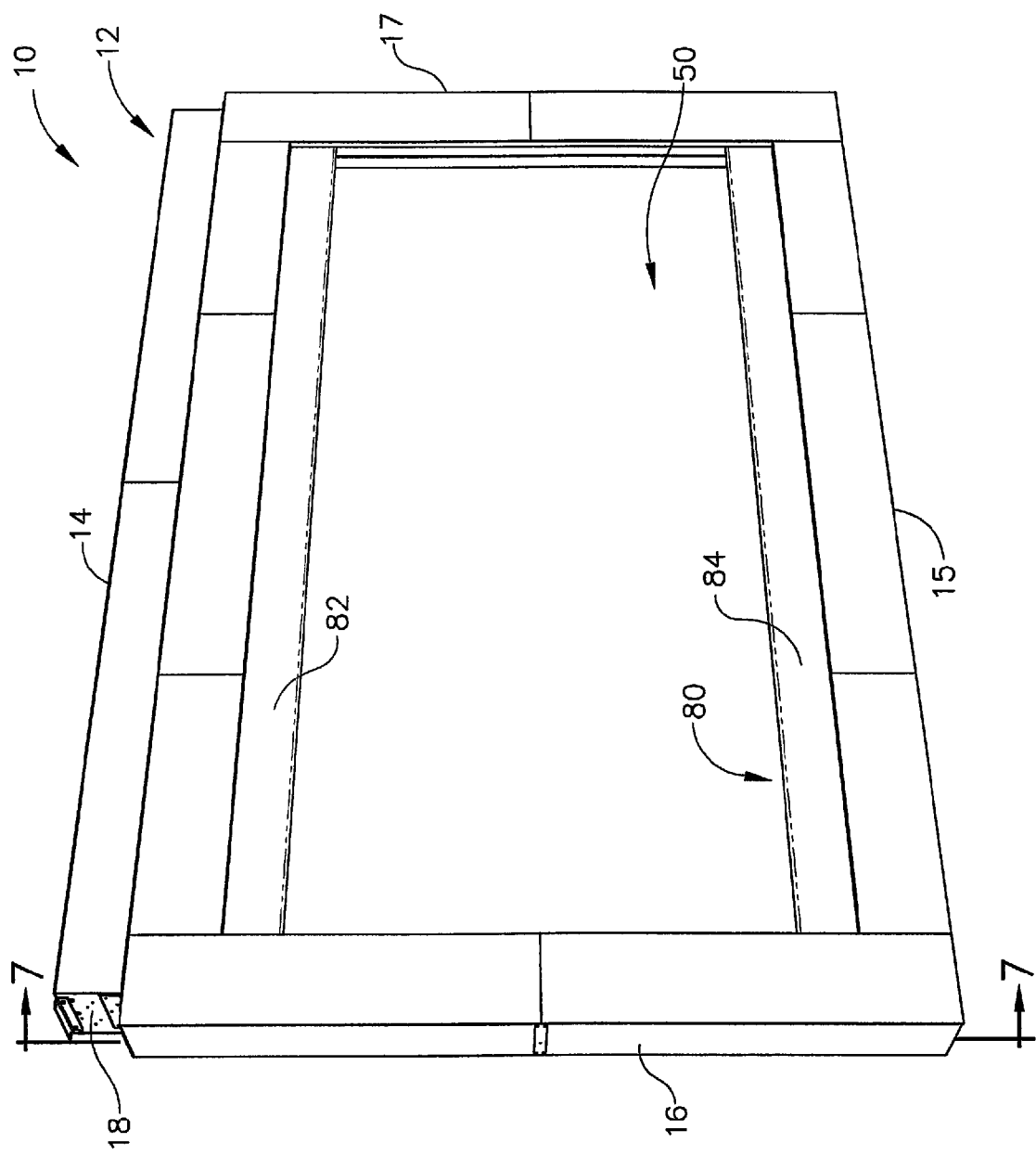
FIG. 1 is a front perspective view of an integral projection screen structure of the invention.
Figure 2:
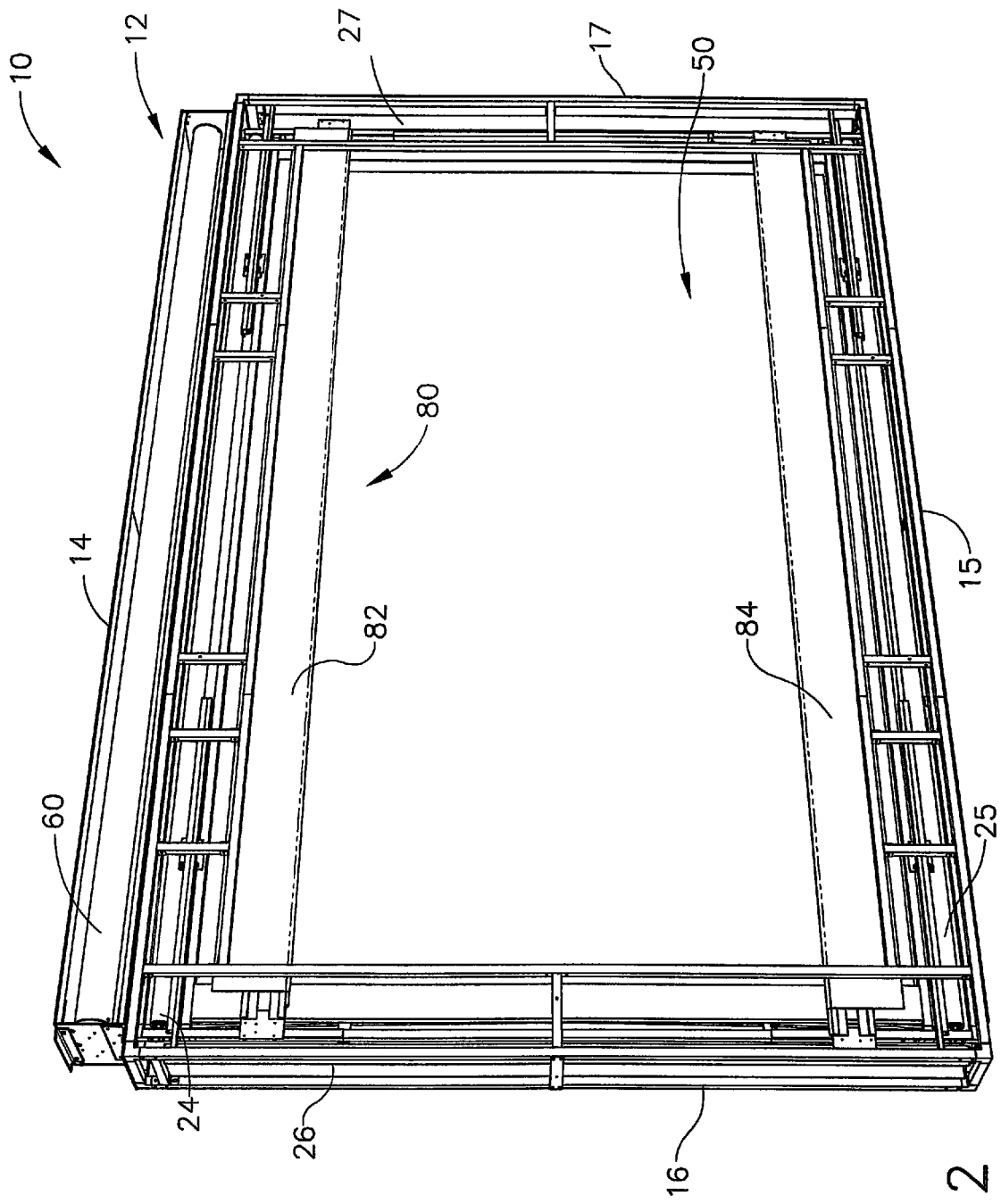
FIG. 2 is a front perspective view of the projection screen structure of FIG. 1 with the front face panels of the frame removed.
Figure 7:
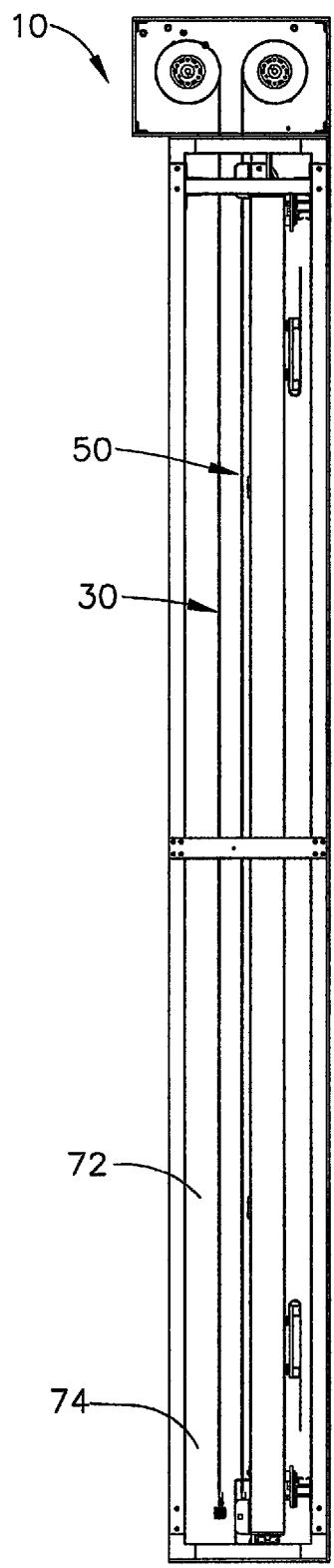
FIG. 7 is a section view of the projection screen structure of FIG. 1, taken along line 7-7 with the left end cap of the top portion of the frame removed.
Figure 8:
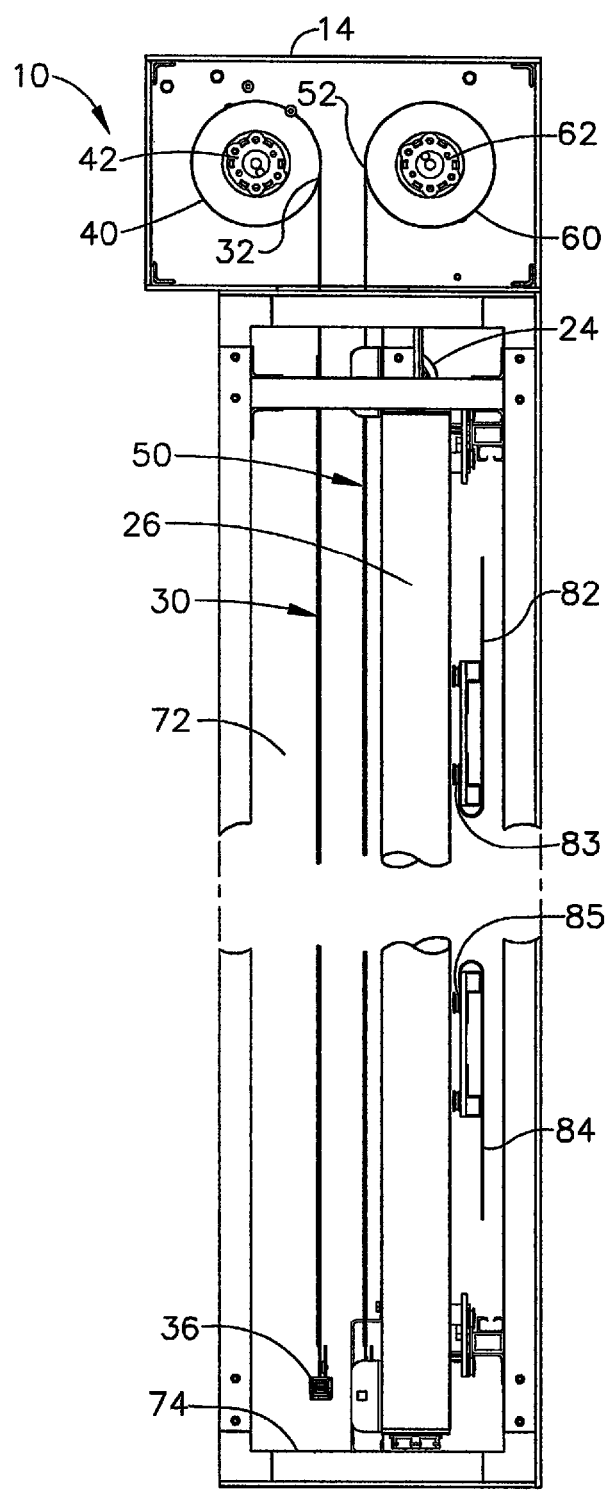
FIG. 8 is an enlarged view of an upper portion and lower portion of the projection screen structure of FIG. 7.
Figure 9:
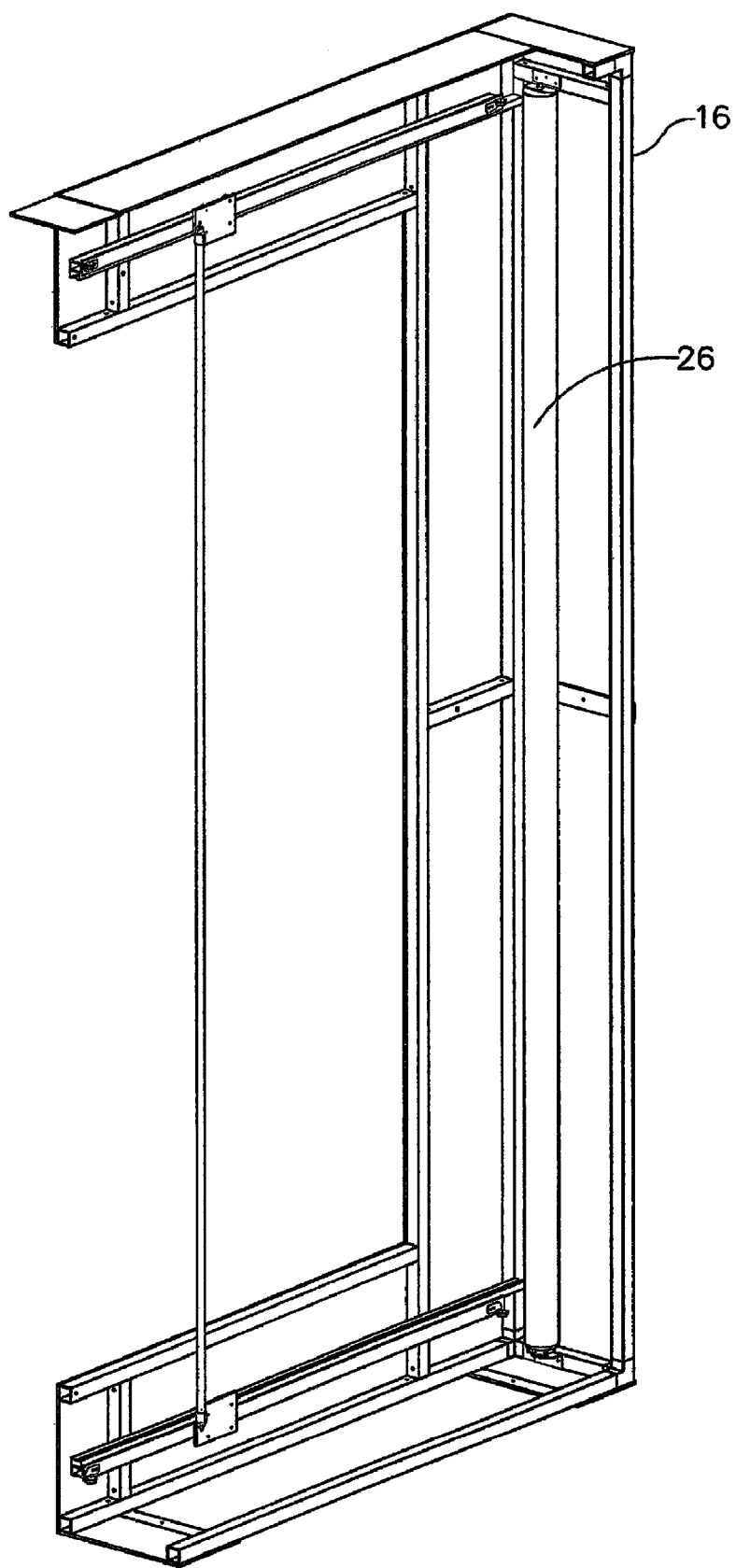
FIG. 9 is a rear perspective view of a portion of the left side of the projection screen structure of FIG. 1.
Figure 10:
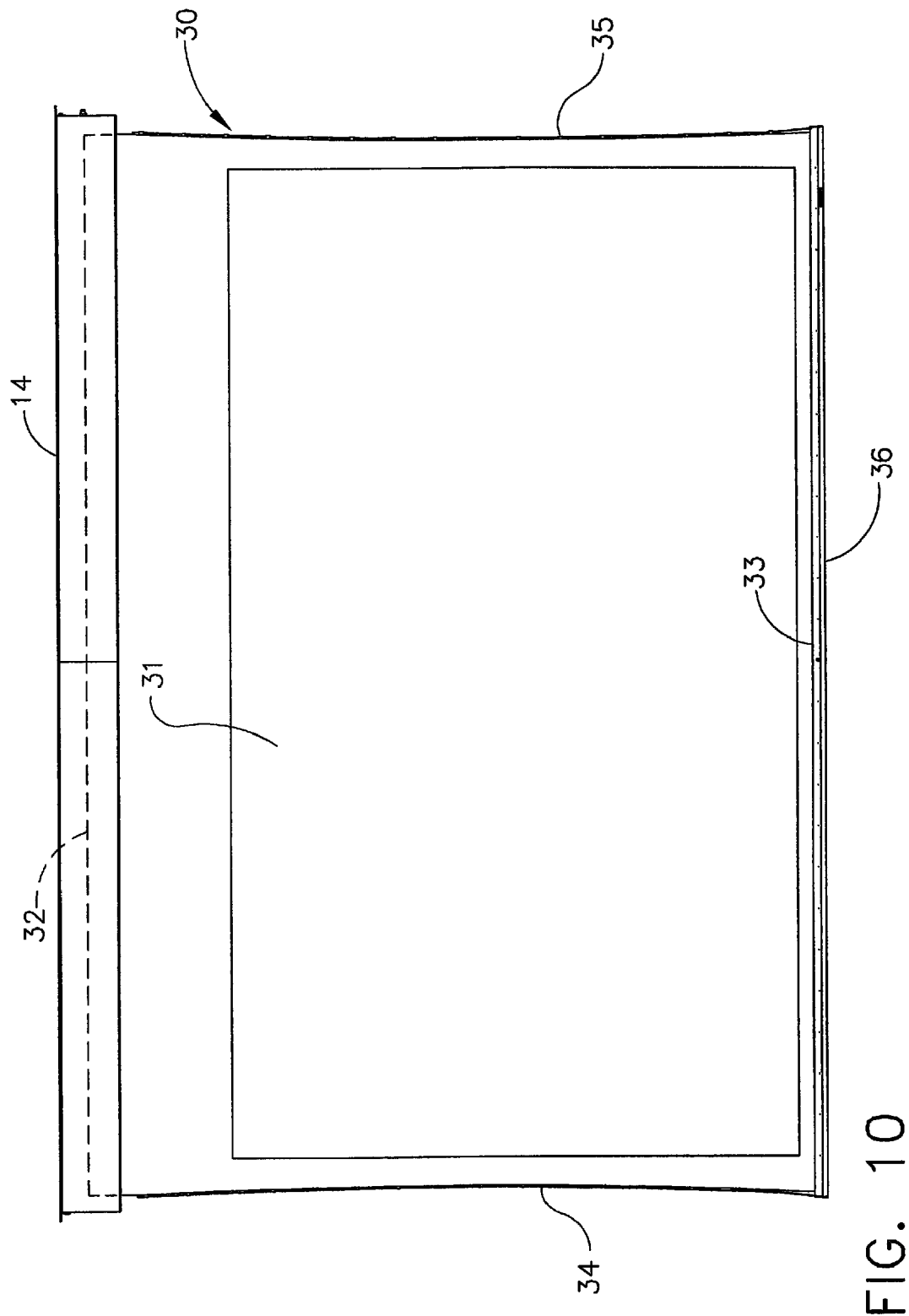
FIG. 10 is a front view of the inner movable projection screen of the screen structure of FIG. 1.
Figure 11:
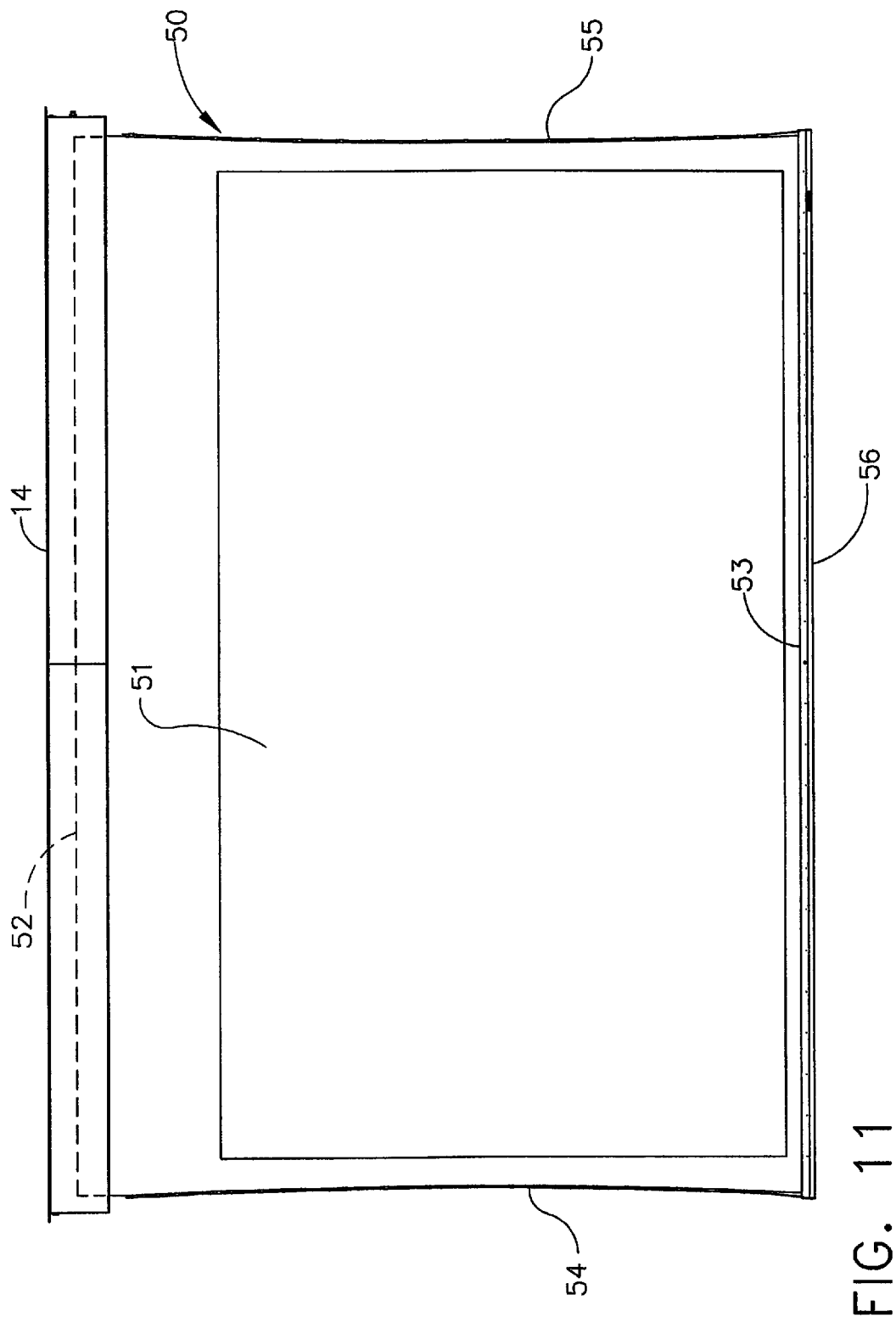
FIG. 11 is a front view of the outer movable projection screen of the screen structure of FIG. 1.

Referring now to the accompanying drawings, FIG. 1 is a front perspective view of integral projection screen structure 10 comprising first (inner) movable projection screen 30 (shown in FIGS. 8 and 10) and second (outer and nearest the viewer) movable projection screen 50 (also shown in FIGS. 8 and 11). These screens are encased in frame 12 having generally parallel top and bottom portions, 14 and 15, and generally parallel first and second side portions, 16 and 17. The bottom 15, first side 16 and second side 17 portions of the frame each have a channel therein, such as channels 72 and 74 shown in FIGS. 7-8, to receive the respective bottom, first and second side portions of movable screens 30 and 50. FIG. 2 is a front view of the projection screen structure of FIG. 1 with the front (outer) face panels of the frame removed to show underlying structures. FIG. 7 is a section view of the projection screen structure of FIG. 1, taken along line 7-7 with the left end cap 18 of top portion 14 of the frame removed. FIG. 8 is an enlarged view of an upper portion and lower portion of the projection screen structure of FIG. 7.

The projection screen structure 10 comprises a first, inner movable projection screen 30. As shown in FIG. 10, screen 30 comprises flexible sheet of material 31, which has a top portion 32 for connection to roller 40 (see FIG. 8), a bottom portion 33 opposite the top portion 32, and first and second side portions, 34 and 35, defining a width of the screen. Screen 30 can be raised and lowered from frame top portion 14 such that the first side portion 34 and second side portion 35 of flexible sheet 31 are slidably movable within channel 70 (not shown) of first side portion 16 of the frame and channel 72 of second side portion 17 of the frame (see FIG. 8). The bottom portion of the flexible sheet 31 is defined by hem bar 36, which provides a weight to keep the screen taut. The hem bar may be made of any suitable material, for example metal, glass, fiberglass, ceramic or plastic. When screen 30 is fully lowered to engage frame bottom portion 15, hem bar 36 resides within channel 74 of bottom portion 15 of the frame (see FIG. 8). Flexible sheet 31 is sized to substantially cover the frame, and may typically be of width up to about 12 feet with a fixed height defining a width to height ratio in the range of about 1 to 3. The sheet typically has a thickness of from about 0.01 inches to about 0.25 inches, more typically from about 0.02 inches to about 0.1 inches.

As shown in FIG. 8, the top portion 32 of the flexible sheet 31 is attached to roller 40 using means known in the art, for example by using adhesive tape, double-sided adhesive tape, glue, staples, screws or other fasteners. Roller 40 may be made from any material that is sufficiently rigid to support the weight of movable screen 30, such as aluminum, steel, or carbon composite. Roller 40 is cut to appropriate length depending on the size of the frame.

Roller 40 is operatively connected to motor 42 such that roller 40 rotates about its longitudinal axis in response to the operation of the motor. In this manner, rotation of roller 40 by motor 42 causes flexible sheet 31 to be raised and lowered with respect to frame top portion 14. Thus, screen 30 is movable between a rolled condition in which the screen is rolled about roller 40 and an unrolled condition in which the screen substantially covers the frame. In one embodiment, motor 42 may be connected to a motor bracket through a motor retaining means. The motor end of roller 40 is then mounted through the motor bracket and mounted to the other side of the frame through an idler bracket and mounting bracket.

Motor 42 may receive control signals from any suitable source such as an infrared (IR) or radio frequency (RF) remote control or a low-voltage wall control. The motor typically is powered from a conventional 120-volt ac wall receptacle, and may be hardwired within a junction box, or to a building distribution panel, or through a 120:24 transformer. It will also be appreciated that other mechanisms, such as a hand crank or a bi-directional clutch, may be utilized for raising and lowering the screen, and that such mechanisms are within the scope of the present invention.

The projection screen structure 10 further comprises a second, outer (nearest the viewer) movable projection screen 50. As shown in FIG. 11, screen 50 comprises flexible sheet of material 51, which has a top portion 52 for connection to roller 60 (see FIG. 8), a bottom portion 53 opposite the top portion 52, and first and second side portions, 54 and 55, defining a width of the screen. Screen 50 can be raised and lowered from frame top portion 14 such that the first side portion 54 and second side portion 55 of flexible sheet 51 are slidably movable within channel 70 (not shown) of first side portion 16 of the frame and channel 72 of second side portion 17 of the frame (see FIG. 8). The bottom portion of the flexible sheet 51 is defined by hem bar 56 (not shown in FIG. 8, but adjacent to hem bar 36), which provides a weight to keep the screen taut. The hem bar may be made of any suitable material, for example metal, glass, fiberglass, ceramic or plastic. When screen 50 is fully lowered to engage frame bottom portion 15, hem bar 56 resides within channel 74 of bottom portion 15 of the frame (see FIG. 8). Flexible sheet 51 is sized to substantially cover the frame, and may typically be of width up to about 12 feet with a fixed height defining a width to height ratio in the range of about 1 to 3. The sheet typically has a thickness of from about 0.01 inches to about 0.25 inches, more typically from about 0.02 inches to about 0.1 inches.

As shown in FIG. 8, the top portion 52 of the flexible sheet 51 is attached to roller 60 using means known in the art, for example by using adhesive tape, double-sided adhesive tape, glue, staples, screws or other fasteners. Roller 60 may be made from any material that is sufficiently rigid to support the weight of movable screen 50, such as aluminum, steel, or carbon composite. Roller 60 is cut to appropriate length depending on the size of the frame.

Roller 60 is operatively connected to motor 62 such that roller 60 rotates about its longitudinal axis in response to the operation of the motor. In this manner, rotation of roller 60 by motor 62 causes flexible sheet 51 to be raised and lowered with respect to frame top portion 14. Thus, screen 50 is movable between a rolled condition in which the screen is rolled about roller 60 and an unrolled condition in which the screen substantially covers the frame. In one embodiment, motor 62 may be connected to a motor bracket through a motor retaining means. The motor end of roller 60 is then mounted through the motor bracket and mounted to the other side of the frame through an idler bracket and mounting bracket.

Motor 62 may receive control signals from any suitable source such as an infrared (IR) or radio frequency (RF) remote control or a low-voltage wall control. The motor typically is powered from a conventional 120-volt ac wall receptacle, and may be hardwired within a junction box, or to a building distribution panel, or through a 120:24 transformer. It will also be appreciated that other mechanisms, such as a hand crank or a bi-directional clutch, may be utilized for raising and lowering the screen, and that such mechanisms are within the scope of the present invention.

Figure 3:
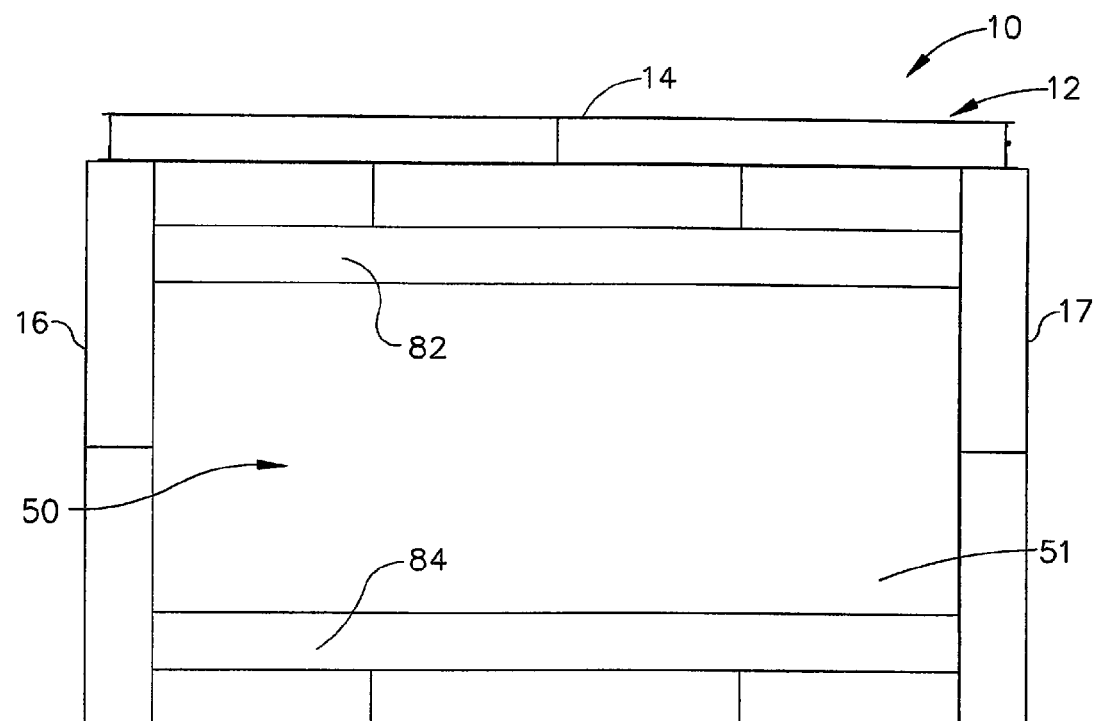
FIG. 3 is a front view of the projection screen structure of FIG. 1, with the top and bottom masking panels deployed.
Figure 4:
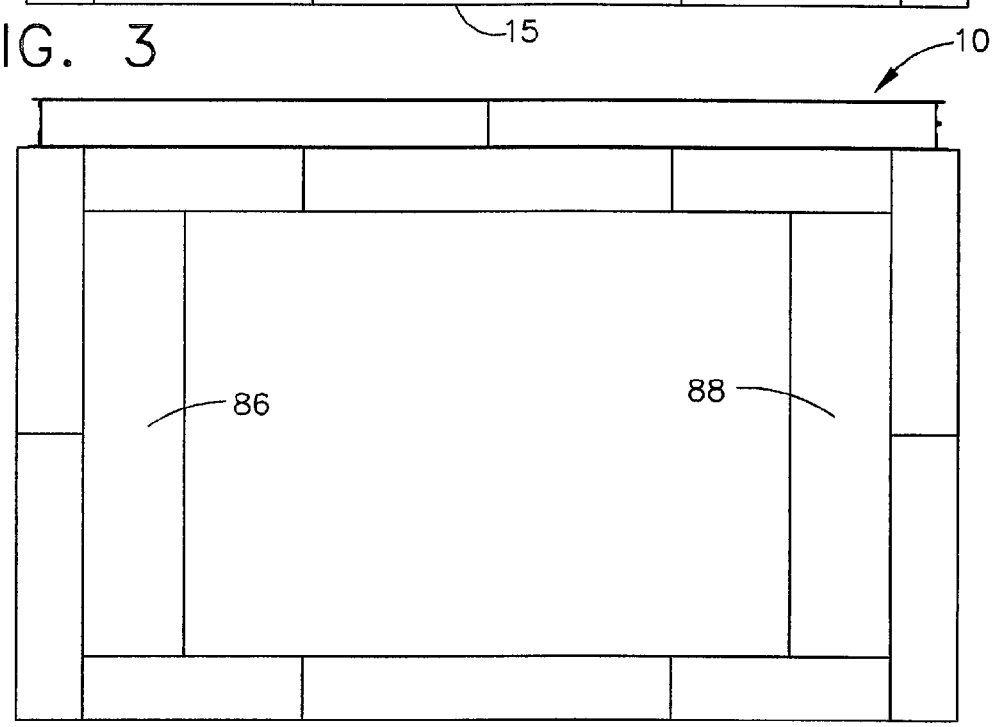
FIG. 4 is a front view of the projection screen structure of FIG. 1, with the left and right masking panels deployed.
Figure 5:
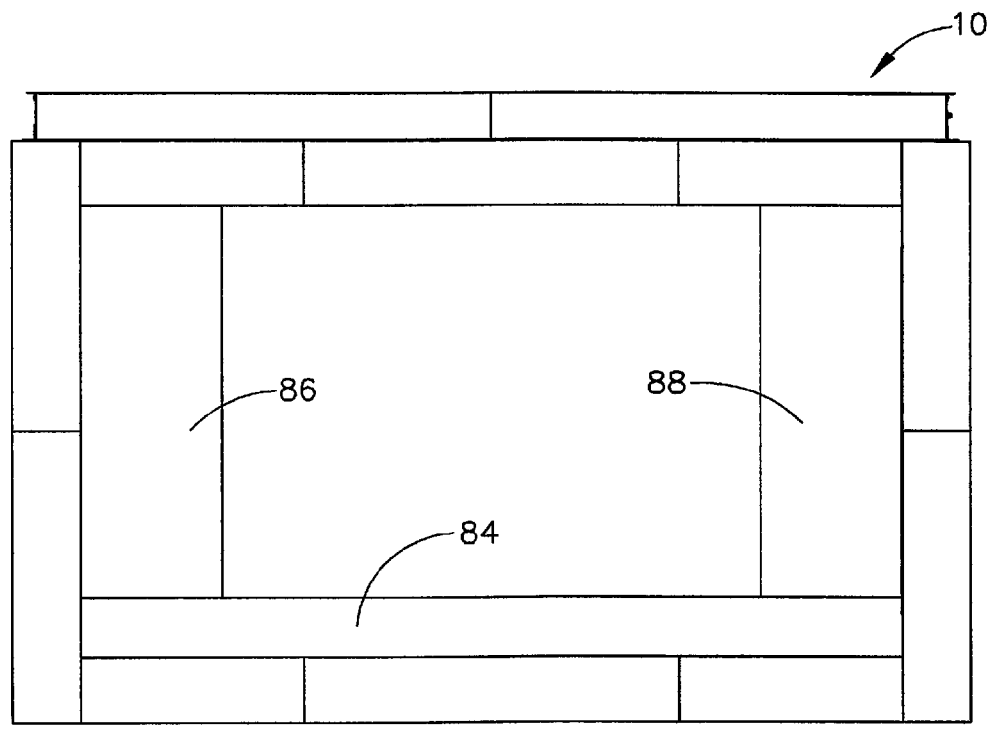
FIG. 5 is a front view of the projection screen structure of FIG. 1, with the left, right and bottom masking panels deployed.
Figure 6:
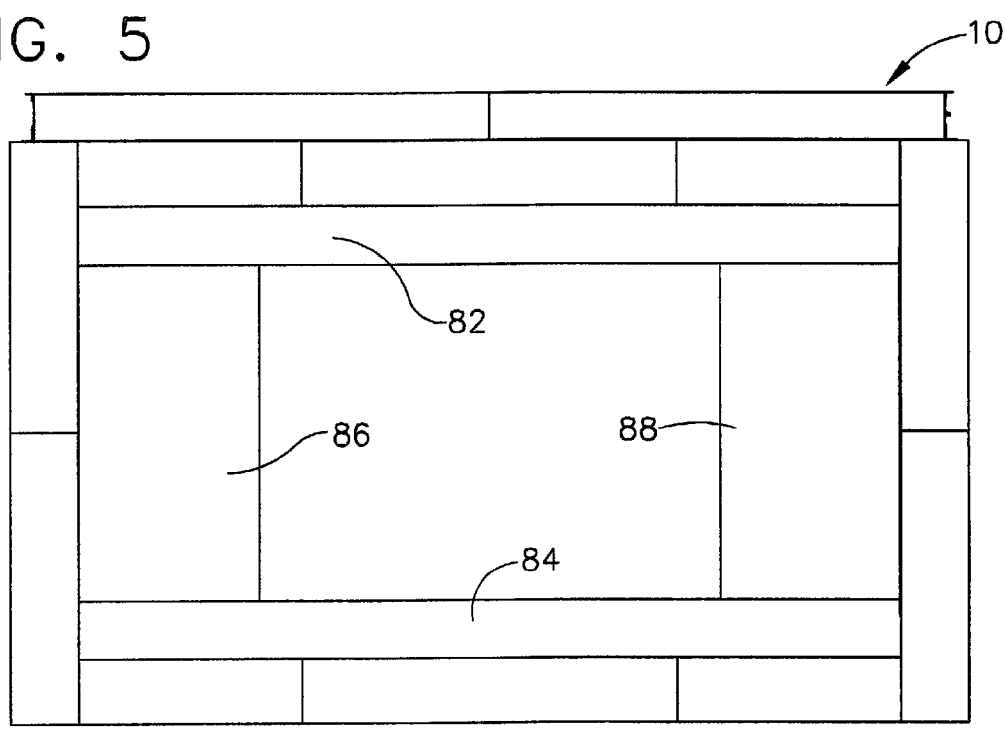
FIG. 6 is a front view of the projection screen structure of FIG. 1, with the left, right, top and bottom masking panels deployed.

As shown in FIGS. 1-3, projection screen structure 10 further comprises masking system 80 comprising top horizontal movable masking panel 82 and bottom horizontal movable masking panel 84 disposed within frame 12 over top portion 52 and bottom portion 54, respectively, of the sheet of material 51 in second movable projection screen 50. Typically, movable masking panels are disposed over the first and second side portions and/or the top and bottom portions of the front side of the sheet of material in the second (outer) movable projection screen. FIG. 4 is a front view of projection screen structure 10 with left vertical movable masking panel 86 and right vertical movable masking panel 88 deployed. FIG. 5 is a front view of projection screen structure 10 with bottom movable masking panel 84, left movable masking panel 86 and right movable masking panel 88 deployed. FIG. 6 is a front view of projection screen structure 10 with top movable masking panel 82, bottom movable masking panel 84, left movable masking panel 86 and right movable masking panel 88 all deployed. Other variations of the masking system may be used so long as at least two movable masking panels are disposed within the frame over at least two of the top portion, bottom portion and first and second side portions of the front side of the sheet in the second movable screen.

The masking panels provide enhanced light absorbance and reduced reflectivity in an image displayed on the flexible sheet of material in the second movable screen. The masking panels typically have a matte or flat appearance, and often have a rigid frame made of any suitable material, such as steel, aluminum, plastic, or wood, covered with an upholstered or knit fabric, such as velour or velvet, or other acoustic or sound attenuating material.

In one embodiment, the masking panels are electronically controllable in order to selectively define a desired image area on the screen surface for viewing images projected in different aspect ratios. The masking panels can be selectively movable using electronically controlled (including infrared remote controlled) motorized means. For example, the masking panels may be driven by motorized roller tubes such as those described above for rolling and unrolling projection screens 30 and 50. In projection screen structure 10, left and right vertical masking panels 86 and 88 are driven by cables (not shown) running from motorized left and right rollers 26 and 27, respectively, to pulleys attached to the masking panels (such as pulleys 83 and 85 attached to top and bottom masking panels 82 and 84, respectively, shown in FIG. 8). The pulleys may move on rails or in channels in the top, bottom and first and second side portions of the frame. When motors drive rollers 26 and 27, the cables wrap or unwrap around the rollers and move masking panels 86 and 88, deploying or retracting them. The top and bottom horizontal masking panels 82 and 84 may be driven by a movable truss, with masking fabric collected onto motorized roller tubes, or a moveable fixed dimension truss moved by cables played onto or off of motorized rollers. In FIG. 2, top masking panel 82 is driven by a movable truss, with masking fabric collected up onto motorized roller 24. Bottom masking panel 84 is a truss member with attached drape, moved by twin cables playing on or off stationary motorized tube 25.

The material for each movable projection screen may comprise any suitable flexible screen material known in the art and selected in accordance with the teachings herein, such as polyvinyl chloride (PVC), acrylic, woven cloth or other material, including commercially available screen materials useful in practicing the invention, such as Stewart Filmscreen Corporation FIREHAWK, GRAYHAWK, ULTRAMATTE 150, VIDEOMATTE 200, and STUDIOTEK 130 projection screen fabrics, or their equivalents. The screen material may optionally have a surface treatment thereon in the form of a pearlescent spray treatment or the like for attaining a selected amount of optical gain for the projection surface, or for generally improving the optical gain of the projection surface. Typical white matte finish surfaces exhibit a gain of about 1.0. Gains of about 1.0 to 2.0 are typical for the materials and surface finishes contemplated herein. Such surface treatment may be particularly desirable for front projection screens herein.

The present invention thus provides an integral projection screen structure for use in displaying imagery from a television, motion picture projection, video projection, computer generated image display, or the like, wherein said structure comprises a frame, first and second movable projection screens, and a masking system therefor, all within the frame. The movable projection screens are arranged in such a way that both are located in nearly the same optical plane so that there is no need to refocus the optical projection equipment that is used to project the image on the two screens. In one embodiment, the appearance of the movable screens is substantially similar so that the two screens have a similar appearance to the viewer. The viewer thus may not notice the difference between the two screens unless they are in motion. While the appearance of the movable screens is substantially similar, the optical properties of the screens are different in order to facilitate the formatting of various kinds of projected imagery. In one embodiment, one screen comprises silver matte material to better project 3-D images and the other screen comprises white matte material to provide similar brightness from all viewing angles.

The invention thus provides an integral projection screen structure having two screen surfaces of differing specifications, either of which may be perforated for sound, deployed in the same frame and sharing one masking system. In one embodiment, the masking system comprises four continuously movable motorized masking panels, which may be equipped with digital encoders. The system can be equipped to memorize and store pre-sets, and can be serially controlled by home automation or room automation devices. The projection screen structure allows two separate screen surfaces to be deployed individually and masked for aspect ratio compliance, with the same masking system. Both screens may be perforated for sound, but since the screens are deployed individually, the sound system behind the screen never has to transmit sound through two perforated surfaces simultaneously. This improves and optimizes the sound quality and visual quality of the system. Either screen surface may be deployed or exchanged with electronic control. In addition, the aspect ratio of either screen surface can be modified as desired, continuously and independently. The projection screen structure thus provides advantages over previous screens that either place two fabrics between the viewer and the sound system, often sounding distorted and muted, or that offer two screen surfaces, but no masking and no perforation. The present invention provides two perforated screen surfaces that can be controlled and accessed independently and individually, with full masking serving either surface. Each screen, though deployed off a motorized roller mechanism, appears to be framed and fully matted by rigid perimeter elements.

In another aspect, the invention relates to a method for manufacturing an integral projection screen structure for displaying an image from a projection source, comprising the steps of: (a) providing a frame having generally parallel top and bottom portions and generally parallel first and second opposing side portions, each side portion forming a channel; (b) providing first and second movable projection screens having surfaces with different optical properties disposed within said frame, each movable projection screen comprising an operable roller for rolling and unrolling the screen and being mounted at the top portion of said frame, and a flexible sheet of material having a projection surface for displaying an image projected thereon, said sheet of material having a front side and a back side, a top portion connected to the roller and being movable between a rolled condition and an unrolled condition, a bottom portion opposite the top portion, and first and second opposing side portions for disposition within the channels formed by the side portions of the frame when the sheet is in the unrolled condition, the second screen being nearest the viewer when in the unrolled condition; and (c) providing a masking system having at least two movable masking panels disposed within said frame over at least two of the top portion, bottom portion and first and second side portions of the front side of the sheet in the second screen.

While particular embodiments of the invention have been described, the invention can be further modified within the spirit and scope of this disclosure. This application is therefore intended to cover any variations, uses or adaptations of the invention using its general principles. Further, the application is intended to cover such departures from the present disclosure as come within known or customary practice in the art to which this invention pertains and which fall within the limits of the appended claims.

What is claimed is:

1. An integral projection screen structure for displaying an image from a projection source, comprising:
    (a) a frame having generally parallel top and bottom portions and generally parallel first and second opposing side portions, each side portion forming a channel;
    (b) first and second movable projection screens having surfaces with different optical properties disposed within said frame, each movable projection screen comprising an operable roller for rolling and unrolling the screen and being mounted at the top portion of said frame, and a flexible sheet of material having a projection surface for displaying an image projected thereon, said sheet of material having a front side and a back side, a top portion connected to the roller and being movable between a rolled condition and an unrolled condition, a bottom portion opposite the top portion, and first and second opposing side portions for disposition within the channels formed by the side portions of the frame when the sheet is in the unrolled condition, the second screen being nearest the viewer when in the unrolled condition; and
    (c) a masking system having at least two movable masking panels disposed within said frame over at least two of the top portion, bottom portion and first and second side portions of the front side of the sheet in the second screen.

2. The projection screen structure of claim 1 wherein the masking system comprises top, bottom, left and right movable masking panels disposed within said frame over the respective top portion, bottom portion and first and second side portions of the front side of the sheet in the second screen.

3. The projection screen structure of claim 1 wherein each movable projection screen comprises a motor operatively connected to the roller such that the roller rotates about its longitudinal axis in response to the operation of the motor.

4. The projection screen structure of claim 3 wherein the top portion of the frame houses the roller and the motor of each movable projection screen, and the bottom portion of the frame forms a channel for receiving the bottom portion of each flexible sheet of material when the sheet is in the unrolled condition.

5. The projection screen structure of claim 1 wherein the sheet of material in each movable projection screen is selected from the group consisting of polyvinyl chloride, woven cloth and acrylic.

6. The projection screen structure of claim 1 wherein the sheet of material in each movable projection screen has a thickness of from about 0.01 inches to about 0.25 inches.

7. The projection screen structure of claim 1 further comprising electronically controllable motorized means operatively connected to each masking panel for selectively moving each masking panel.

8. The projection screen structure of claim 1 wherein said masking panels comprise velour material.

9. An integral projection screen structure for displaying an image from a projection source, comprising:
    (a) a frame having generally parallel top and bottom portions and generally parallel first and second opposing side portions, each side portion forming a channel;
    (b) first and second movable projection screens having surfaces with different optical properties disposed within said frame, each movable projection screen comprising an operable roller for rolling and unrolling the screen and being mounted at the top portion of said frame, a motor operatively connected to the roller such that the roller rotates about its longitudinal axis in response to the operation of the motor, and a flexible sheet of material having a projection surface for displaying an image projected thereon, said sheet of material having a front side and a back side, a top portion connected to the roller and being movable between a rolled condition and an unrolled condition, a bottom portion opposite the top portion, and first and second opposing side portions for disposition within the channels formed by the side portions of the frame when the sheet is in the unrolled condition, the second screen being nearest the viewer when in the unrolled condition; and
    (c) a masking system having top, bottom, left and right movable masking panels disposed within said frame over the respective top portion, bottom portion and first and second side portions of the front side of the sheet in the second screen.

10. The projection screen structure of claim 9 wherein the masking system comprises top, bottom, left and right independently movable masking panels disposed within said frame over the respective top portion, bottom portion and first and second side portions of the front side of the sheet of material in the second movable projection screen.

11. The projection screen structure of claim 9 wherein the top portion of the frame houses the roller and the motor of each movable projection screen, and the bottom portion of the frame forms a channel for receiving the bottom portion of the flexible sheet of material when the sheet is in the unrolled condition.

12. The projection screen structure of claim 9 wherein the sheet of material in each movable projection screen is selected from the group consisting of polyvinyl chloride, woven cloth and acrylic.

13. The projection screen structure of claim 9 wherein the sheet of material in each movable projection screen has a thickness of from about 0.01 inches to about 0.25 inches.

14. The projection screen structure of claim 9 further comprising electronically controllable motorized means operatively connected to each masking panel for selectively moving each masking panel.

15. The projection screen structure of claim 14 wherein the top portion of the frame houses the roller and the motor of each movable projection screen, and the bottom portion of the frame forms a channel for receiving the bottom portion of each flexible sheet of material when the sheet is in the unrolled condition.

16. The projection screen structure of claim 15 wherein the sheet of material in each movable projection screen is selected from the group consisting of polyvinyl chloride, woven cloth and acrylic, and has a thickness of from about 0.01 inches to about 0.25 inches.

17. An integral projection screen structure for displaying an image from a projection source, comprising:
   (a) a frame having generally parallel top and bottom portions and generally parallel first and second opposing side portions, each side portion forming a channel;
   (b) first and second movable projection screens having surfaces with different optical properties disposed within said frame, each movable projection screen comprising an operable roller for rolling and unrolling the screen and being mounted at the top portion of said frame, a motor operatively connected to the roller such that the roller rotates about its longitudinal axis in response to the operation of the motor, and a flexible sheet of material having a projection surface for displaying an image projected thereon, said sheet of material having a front side and a back side, a top portion connected to the roller and being movable between a rolled condition and an unrolled condition, a bottom portion opposite the top portion, and first and second opposing side portions for disposition within the channels formed by the side portions of the frame when the sheet is in the unrolled condition, the second screen being nearest the viewer when in the unrolled condition; and
   (c) a masking system having top, bottom, left and right independently movable masking panels disposed within said frame over the respective top portion, bottom portion and first and second side portions of the front side of the sheet in the second screen.

18. The projection screen structure of claim 17 further comprising electronically controllable motorized means operatively connected to each masking panel for selectively moving each masking panel.

19. The projection screen structure of claim 18 wherein the top portion of the frame houses the roller and the motor of each movable projection screen, and the bottom portion of the frame forms a channel for receiving the bottom portion of each flexible sheet of material when the sheet is in the unrolled condition.

20. The projection screen structure of claim 19 wherein the sheet of material in each movable projection screen is selected from the group consisting of polyvinyl chloride, woven cloth and acrylic.

21. The projection screen structure of claim 20 wherein said masking panels comprise the same velour material.

\* \* \* \* \*